(12) United States Patent
Trimberger (10) Patent No.: US 7,191,339 B1
(45) Date of Patent: Mar. 13, 2007

(54) SYSTEM AND METHOD FOR USING A PLD IDENTIFICATION CODE

(75) Inventor: Stephen M. Trimberger, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 716 days.

(21) Appl. No.: 09/950,420

(22) Filed: Sep. 10, 2001

(51) Int. Cl.
H04L 9/00 (2006.01)
H04L 9/32 (2006.01)
G06F 11/30 (2006.01)
G06F 12/14 (2006.01)
G11C 11/34 (2006.01)
G11C 7/00 (2006.01)
G06F 7/38 (2006.01)
H03K 19/173 (2006.01)
H03K 19/177 (2006.01)

(52) U.S. Cl. ............ 713/185; 713/193; 713/194; 365/185; 365/200; 326/37; 326/38; 326/39

(58) Field of Classification Search ............ 713/193, 713/194, 200; 714/736, 746; 365/185, 200; 380/265, 44; 326/37–39
See application file for complete search history.

(56) References Cited

U.S. PATENT DOCUMENTS

| | | | |
|---|---|---|---|
| 5,970,142 A * | 10/1999 | Erickson | 713/189 |
| 6,101,624 A * | 8/2000 | Cheng et al. | 714/736 |
| 6,351,814 B1 * | 2/2002 | Batinic et al. | 713/194 |
| 6,356,637 B1 * | 3/2002 | Garnett | 380/265 |
| 6,604,214 B1 * | 8/2003 | Fukushima | 714/746 |
| 6,791,353 B1 * | 9/2004 | Beal et al. | 326/39 |
| 2001/0016920 A1 * | 8/2001 | Chan | 714/11 |
| 2001/0032318 A1 * | 10/2001 | Yip et al. | 713/190 |
| 2001/0037458 A1 * | 11/2001 | Kean | 713/193 |
| 2002/0018561 A1 * | 2/2002 | Emelko | 380/28 |

OTHER PUBLICATIONS

Ajluni, 'Give Your IP a Unique ID wth Silicon Fingerprinting', Feb. 7, 2000, Electronic Design, ED Online ID#1122.*

* cited by examiner

Primary Examiner—Ayaz Sheikh
Assistant Examiner—Shin-Hon Chen
(74) Attorney, Agent, or Firm—Jeanette S. Harms; LeRoy D. Maunu (57) ABSTRACT

A method of programming a programmable logic device (PLD) includes identifying and reading an identification code on the PLD. At this point, a plurality of check bits can be generated based on the identification code. These check bits can be used to correct any errant bits in the identification code at a subsequent point in time. A first key is then created using the identification code. The configuration bitstream is encrypted using the first key. The encrypted bitstream and the check bits are then stored for subsequent use. To program the PLD, the stored check bits are transmitted to the PLD and used to correct any errant bits in the identification code at that point in time. A second key is then created using the corrected identification code. The encrypted configuration bitstream is then transmitted to the PLD and decrypted using the second key.

18 Claims, 6 Drawing Sheets

SYSTEM AND METHOD FOR USING A PLD IDENTIFICATION CODE

BACKGROUND OF THE INVENTION

1. Field of the Invention

The present invention relates to the identification of a programmable logic device (PLD), and specifically to a system and a method for using a PLD identification code.

2. Description of the Related Art

Identifying integrated circuits (ICs) is known in the art. Providing a unique identification (ID) for each IC can be useful in determining the functionality or performance of the IC, monitoring inventory, and allowing law enforcement to quickly find and recover stolen ICs. A typical IC identification scheme includes providing a bit pattern that is unique to a specific IC.

In one embodiment, each IC can have its own silicon ID. For example, in a proprietary scheme licensed by SiidTech Inc., an array comprising pairs of transistors (typically located on the periphery of the IC) provides the unique IC identification, wherein each pair of transistors provides one bit of the ID. In this scheme, an ID checker (typically located adjacent the array) senses the difference in the threshold voltages of each pair of transistors and assigns a logic value to each pair of transistors based on the difference in the threshold voltages. Thus, the SiidTech ID scheme advantageously relies on the inherent statistical variation in the transistors to provide the silicon ID. In one implementation, the array includes 310 transistors, thereby providing 155 bits in the silicon ID.

Unfortunately, the threshold voltage of a transistor can change, albeit rarely, due to temperature and voltage. In fact, SiidTech indicates that in an array providing 155 bits, as many as nine bits can change over the lifetime of the IC. However, when an IC is being identified, even a single bit changing will result in an incorrect identification. Therefore, a need arises for a system and method for providing a unique silicon ID that ensures a correct identification.

SUMMARY OF THE INVENTION

In accordance with the present invention, a method of programming a programmable logic device (PLD) includes identifying and reading an identification code on the PLD. In one embodiment, the identification code includes a silicon fingerprint on the PLD. At this point, a plurality of check bits can be generated based on the identification code. These check bits can be used to correct any errant bits in the identification code at a subsequent point in time. In one embodiment, generating the check bits can include using a product code or a Reed-Solomon code. Identifying the identification code on the PLD, reading the identification code, and/or generating the plurality of check bits can be performed by a non-volatile storage device, such as a programmable read-only memory (PROM). Alternatively, identifying the identification code on the PLD, reading the identification code, and/or generating the plurality of check bits can be performed by an external device including software.

The identification code on the PLD can be used as a key for decrypting data sent to the PLD. A first key is then created using the identification code. The configuration bitstream is encrypted using the first key. Encrypting the configuration bitstream can include DES or any known encryption algorithm. The encrypted bitstream and the check bits are then stored for subsequent use. In one embodiment, a non-volatile memory device, such as a PROM, can provide this storage.

To program the PLD, the stored check bits are transmitted to the PLD and used to correct any errant bits in the identification code at that point in time. A second key is then created using the corrected identification code. The encrypted configuration bitstream is then transmitted to the PLD and decrypted using the second key.

Thus, in accordance with one feature of the present invention, a bitstream for programming a PLD includes a first set of bits comprising check bits. These check bits are generated using an identification code on the PLD. The bitstream further includes a second set of bits comprising an encrypted bitstream generated using a key based on the identification code of the PLD at a second point in time. In one embodiment, the identification code includes a silicon fingerprint on a field programmable gate array (FPGA).

In accordance with another feature of the present invention, a system is provided for generating a bitstream used to program a programmable logic device (PLD), wherein the PLD includes a plurality of ID bits. Specifically, in one embodiment, the system includes a computer usable medium having a plurality of computer readable program codes embodied therein, wherein a first computer readable program code generates check bits based on the ID bits at a first point in time and a second computer readable program code encrypts the bitstream using a first key based on the ID bits substantially at the first point in time. The system further includes a first set of logic on the PLD that uses the check bits to correct any errant bits in the ID bits at a second point in time and a second set of logic on the PLD that creates a second key based on the corrected ID bits after the second point in time. Finally, the system includes a third set of logic on the PLD that allows the PLD to decrypt the encrypted bitstream using the second key. In an alternative embodiment, the functions performed by the first, second, and third sets of logic can be performed by computer readable program code.

The present invention can advantageously use the identification code of the PLD to protect the intellectual property (IP) associated with the configuration bitstream. Specifically, a bitstream provided to program a PLD in accordance with the present invention includes a plurality of check bits that are transmitted (or at least used) before an encrypted configuration bitstream. These check bits can correct for multiple bit errors. Thus, if the identification code includes several bits that have changed since the time the first key was created, then the check bits can correct those errant bits. In this manner, when the second key is created, the second key should match the first key, thereby allowing the encrypted configuration bitstream to be decrypted. Clearly, a different identification code from another device would result in a second key that would not match the first key. In this case, the encrypted configuration bitstream could not be decrypted, thereby preventing the misuse of the IP in that bitstream.

In accordance with another feature of the present invention, a method of identifying a PLD is provided. The method includes providing an identification code on the PLD, reading the identification code, and generating a plurality of check bits based on the identification code. At a subsequent point in time, the check bits can be transmitted to the PLD and used to correct any errant bits in the identification code.

DETAILED DESCRIPTION OF THE DRAWINGS

Programmable logic devices (PLDs) are well known in the art of integrated circuits. A PLD can be user-programmed in the field to implement logic designs. One type of PLD is the field programmable gate array (FPGA). In a typical architecture, an FPGA includes an array of configurable logic blocks (CLBs) surrounded by programmable input/output blocks (IOBs). The IOBs provide the interface between the package pins and the CLBs, whereas the CLBs provide the functional elements for constructing logic on the FPGA. The CLBs and IOBs are interconnected by a hierarchy of programmable routing resources.

These CLBs, IOBs, and programmable routing resources are customized by loading a configuration bitstream into the FPGA. This configuration bitstream is generated using known FPGA software, such as the Alliance™, Foundation™, or Foundation ISE™ software, all licensed by the assignee of the present invention. This FPGA software can receive a top-level design provided by a user, wherein the top-level design designates the logic design that will be implemented on the FPGA. In one embodiment, the FPGA software can receive the top-level design in VHDL, Verilog, or in standard schematic form. The FPGA software generates the configuration bitstream that will program an FPGA to provide the functions designated by the top-level design.

A configuration bitstream can represent a significant investment to a company. Specifically, generating an optimized top-level design that leverages the programmable resources of a certain type of FPGA can take considerable expertise and/or man-hours. The generated configuration bitstream is typically stored off-chip on a non-volatile storage device, such as a PROM.

These stored bitsteams can then be easily copied and used to program other FPGAs. Unfortunately, this ease of use also means a loss of control over the intellectual property (IP) associated with the bitstream. Therefore, many companies seek to maintain the confidentiality of their proprietary bitstreams.

Figure 1:
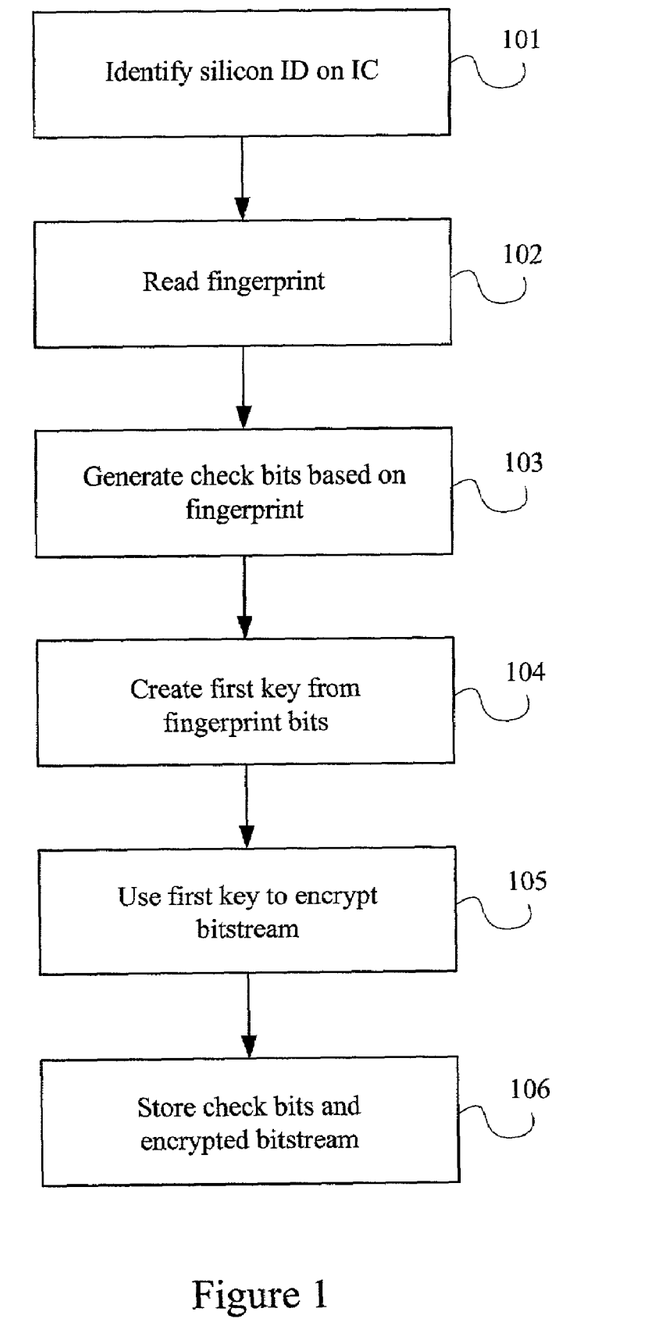
FIG. 1 illustrates a flow chart for generating an encrypted configuration bitstream for a PLD using the identification code of the PLD in accordance with one embodiment of the present invention.

In accordance with one feature of the present invention, a silicon ID (as described above) of a programmable logic device (PLD) can be used to generate an encryption key. FIG. 1 illustrates a flow chart for one embodiment of generating and using such an encryption key. In this embodiment, the silicon ID (also referenced herein as a "fingerprint") of the integrated circuit (IC) is identified in step 101. This fingerprint is then read from the IC using known methods, such as via a JTAG chain, in step 102. Based on this fingerprint, a plurality of check bits (described in detail below) can be generated in step 103 to correct a predetermined number of errant bits. In step 104, a first key is generated from the bits of the fingerprint. This first key can be used to encrypt the configuration bitstream of the FPGA in step 105. Finally, in step 106, the generated check bits and the encrypted bitstream can be stored for subsequent use (described in reference to FIG. 2). In one embodiment, the generated check bits and the encrypted bitstream can be stored in a non-volatile storage device, such as a programmable read-only memory (PROM).

Figure 2:
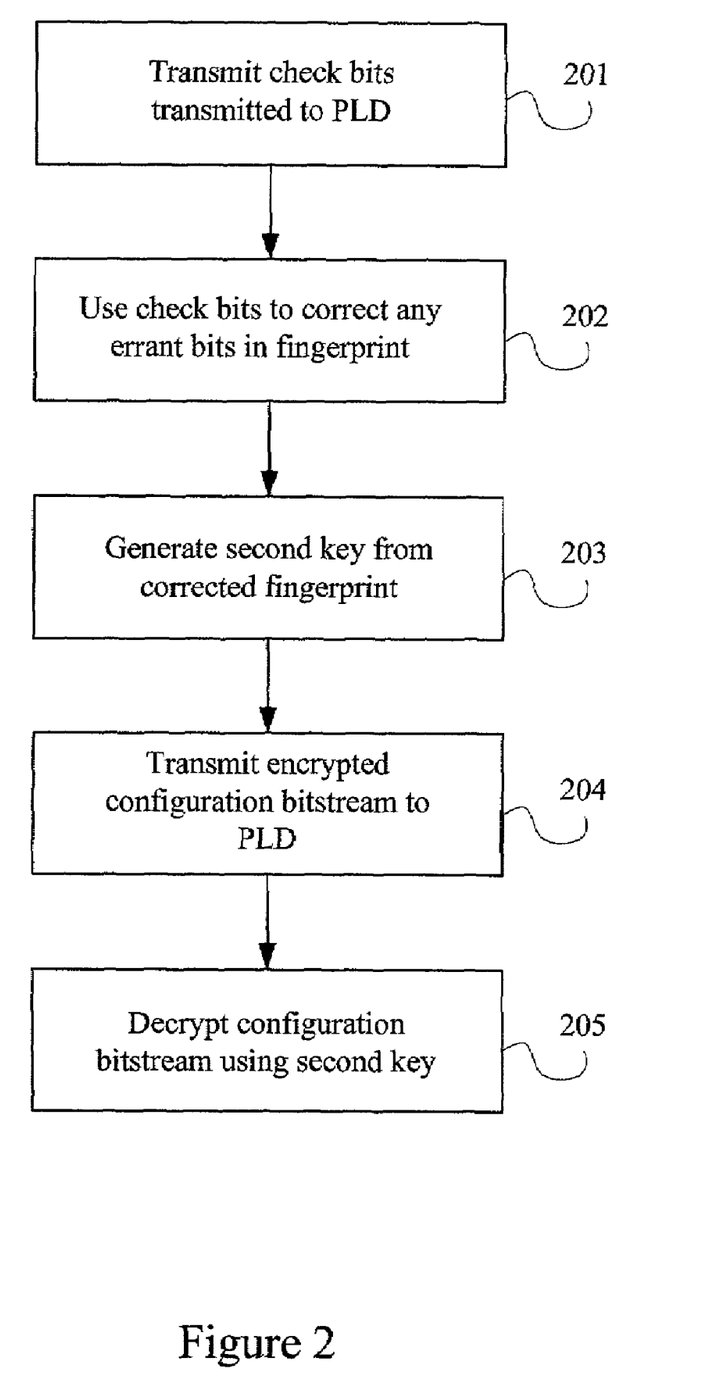
FIG. 2 illustrates a flow chart for decrypting the encrypted configuration bitstream using check bits and a corrected identification code of the PLD in accordance with one embodiment of the present invention.

FIG. 2 illustrates a flow chart of one method of using the check bits and the encrypted configuration bitstream during a subsequent decryption operation. In step 201, the stored check bits are transmitted to the PLD. These check bits can correct a predetermined number of bits that may have changed ("errant bits") since the time of the original reading of the fingerprint (step 102 in FIG. 2). These errant bits can be corrected using the check bits in step 202. A second key is then generated from the corrected fingerprint in step 203. Assuming the same PLD is being used, the second key should match the first key. In this manner, the stored, encrypted configuration bitstream can be transmitted to the PLD in step 204 and subsequently decrypted using the second key in step 205. If different PLDs were used to create the first and second keys, then the second key cannot decrypt the configuration bitstream encrypted using the first key. Thus, the present invention provides an elegant protection for the valuable resources associated with the configuration bitstream.

In one embodiment, if the number of errant bits is greater than the predetermined number, then the PLD could try to correct the errant bits, but end up generating an incorrect second key. Alternatively, under these circumstances, the PLD could be programmed to generate an output indicating that an uncorrectable multi-bit error has occurred.

In this application of the present invention, even one errant bit that is not corrected in the identification code will result in the PLD being unable to decrypt the encrypted configuration bitstream. Therefore, in contrast to mere misidentification in the prior art applications, the present invention requires an error-free fingerprint to allow use of the PLD.

In accordance with one feature of the present invention, an error-correcting code can generate the check bits necessary to correct up to a predetermined number of errants bits in the fingerprint. Note that although certain known error-correcting codes are discussed in detail herein, any error-correcting code providing for the correction of the errant bits can be applied to the present invention.

One known error-correcting code is the Hamming code. A (7,4) Hamming code is provided to explain the principals of a parity-check code. In the (7,4) Hamming code, a sequence of 4 source bits is supplemented with redundancy bits (i.e. the check bits), thereby resulting in total of 7 transferred bits. Table 1 illustrates one example of a (7,4) Hamming code.

TABLE 1

(7,4) Hamming Code

| Source Bits | Transmitted Bits |
|---|---|
| 0000 | 0000000 |
| 0001 | 0001011 |
| 0010 | 0010111 |
| 0011 | 0011100 |
| 0100 | 0100110 |
| 0101 | 0101101 |
| 0110 | 0110001 |
| 0111 | 0111010 |
| 1000 | 1000101 |
| 1001 | 1001110 |
| 1010 | 1010010 |
| 1011 | 1011001 |
| 1100 | 1100011 |
| 1101 | 1101000 |
| 1110 | 1110100 |
| 1111 | 1111111 |

In the Hamming code, the transmitted bits are generated by the use of modulo-2 arithmetic, which is well known to those skilled in the art. As can be noted by reference to Table 1, transmitted bits 1–4 are identical to the source bits, transmitted bit 5 is a parity bit of the source bits 1–3, transmitted bit 6 is a parity bit of source bits 2–4, and transmitted bit 7 is a parity bit of source bits 1, 3, and 4. In other words, each parity bit is computed on different combinations of source bits. In this manner, these parity, i.e. check, bits can identify and correct (i.e. complement) an errant source bit. In this example, if bit 2 is in error, then bit 6 will not match. If bit 4 is in error, then bits 6 and 7 will not match. If bit 1 or 3 is in error, then bits 5 and 7 will not match. The appropriate bit to correct can be determined by Table 1.

Note that various (7,4) Hamming codes are available. For example, in another (7,4) Hamming code, the first check bit is a parity bit of source bits 2, 3, and 4; the second check bit is a parity bit of source bits 1, 3, and 4; and the third check bit is a parity bit of source bits 1, 2, and 4. In this example, if bit 1 is in error, then check bits 2 and 3 will not match; if bit 2 is in error, then check bits 1 and 3 will not match; if bit 3 is in error, then check bits 1 and 2 will not match; and if bit 4 is in error, then check bits 1, 2, and 3 will not match.

The number of check bits is defined by the following inequality: $2^S+C \leq 2^C$, wherein S is the number of source bits and C is the number of check (parity) bits. An additional check bit is often added to enable the Hamming code to detect a double-bit error as well as correct the single-bit error.

A Hamming distance, which refers to the bit difference between code words, is typically derived by performing an exclusive OR between code words and then counting the 1 bits in the result. Thus, for example, the Hamming distance between code words 1100011 and 0100110 is 3.

A code with a Hamming distance of N can correct (N−1)/2 bits. Note that if N is even, then an additional bit in error can be detected. Extending on an additional bit in error is typically done by adding a parity bit on all bits.

The Hamming code, although providing an elegant solution for single-error correction, fails to provide an adequate solution for multiple-error source bits, as forecast for the above-described silicon ID.

Figure 3:
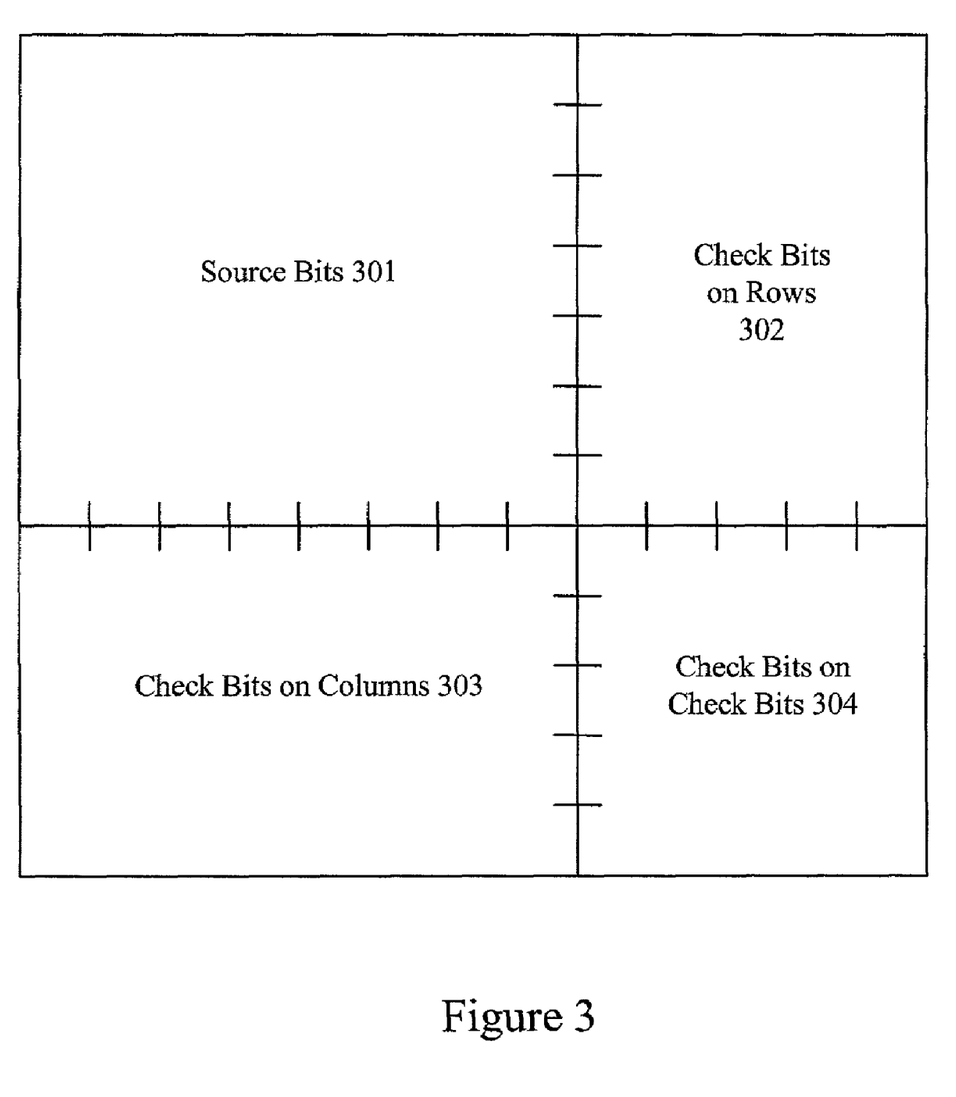
FIG. 3 illustrates a generic product code that can be used in the present invention, wherein the product code includes source bits, check bits on the rows, check bits on the columns, and check bits on the check bits.

In contrast, a product code can correct for multiple-error source bits. FIG. 3 illustrates a generic, two-dimensional (2D) representation of a product code including source bits 301, check bits on rows 302, check bits on columns 303, and check bits on check bits 304. The Hamming distance of a product code is the product of the Hamming distance of the row code and the Hamming distance of the column code. For example, assume that a key in accordance with present invention has 56 bits. This key can be arranged in an array of bits having 7 rows and 8 columns. If the check bits on rows 302 provide a Hamming distance of 4 and the check bits on columns 303 provide a Hamming distance of 3, then the overall code provides a Hamming distance of 12.

In this example, for each 8-bit source word in a row, 5 check bits can be added to provide a Hamming distance of 4. Thus, 5 bits are added to each row and column of source bits 301 (indicated by check bits on rows 302 and check bits on columns 303). The SEC/DED calculation is performed on check bits 302/303, wherein the check bits on the check bits 304 ensure that even errors in the check bits 302/303 can be corrected. The resulting transferred code in this example has (8+5)×(7+5)=156 bits with a Hamming distance of 4×4=16. Thus, up to 7 bit errors can be corrected, and 8 bit errors can be detected. Note that more errant bits can be corrected by adding additional check bits, i.e. either providing a greater Hamming distance on each row/column or going to a three-dimensional array (both processes being known to those skilled in the art).

Figure 4:
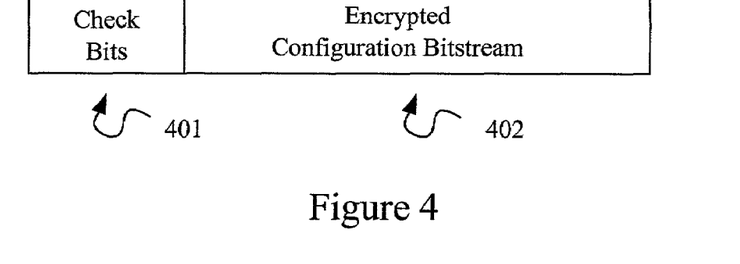
FIG. 4 illustrates a bitstream for programming a PLD in accordance with the present invention.

Thus, referring to FIG. 4, a bitstream provided to program a PLD in accordance with the present invention includes a plurality of check bits 401 that are transmitted (or at least used) before an encrypted configuration bitstream 402. Advantageously, check bits 401 can correct for multiple bit errors. Specifically, if the identification code includes several bits that have changed since the time the first key was created in step 104 (FIG. 1), check bits 401 can correct those errant bits in step 202 (FIG. 2). In this manner, when the second key is created in step 203, the second key should match the first key, thereby allowing the encrypted configuration bitstream to be decrypted in step 205. Clearly, a different identification code from another device would result in a second key that would not match the first key. In this case, the encrypted configuration bitstream could not be decrypted, thereby preventing the misuse of the intellectual property (IP) in that bitstream.

In accordance with one feature of the present invention, a system including software can be used to provide this unique application for the identification code of the PLD. In one embodiment, the system can include a computer usable medium. The computer usable medium has a computer readable program code embodied therein as described in further detail below.

Figure 5:
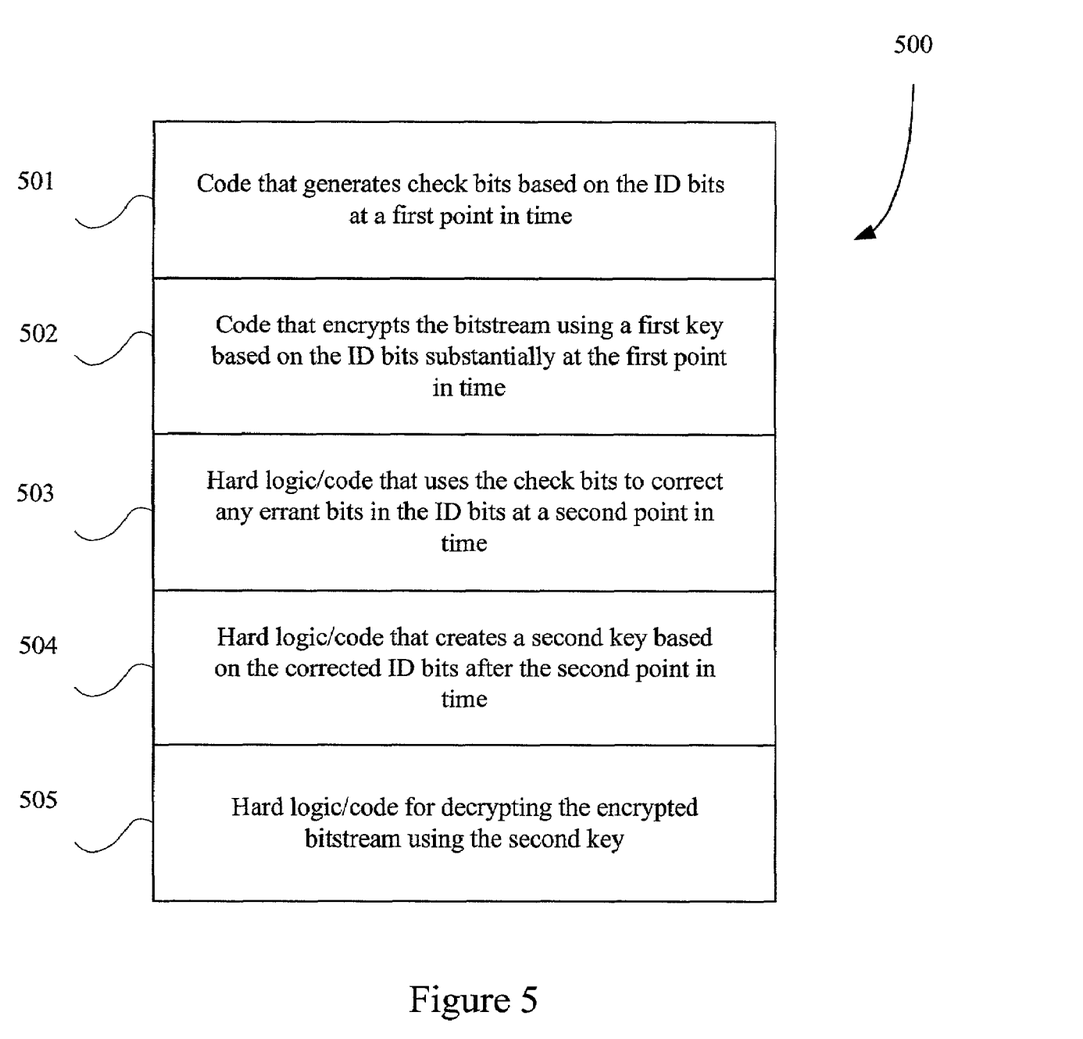
FIG. 5 illustrates software code that can be used in accordance with the present invention.

FIG. 5 illustrates an exemplary system 500 including a first computer readable program code 501 that generates check bits based on the ID bits at a first point in time and a second computer readable program code 502 that encrypts the bitstream using a first key based on the ID bits substantially at the first point in time. System 500 further includes a first set of logic 503 in the PLD that uses the check bits to correct any errant bits in the ID bits at a second point in time and a second set of logic 504 in the PLD that creates a second key based on the corrected ID bits after the second point in time. Finally, system 500 includes a third set of logic 505 in the PLD that allows the PLD to decrypt the encrypted bitstream using the second key. Note that the logic can be implemented by a configuration bitstream or can be implemented as fixed logic on the PLD. In one embodiment, the functions performed by the first, second, and third sets of logic can instead be performed by additional portions of computer readable program code.

The computer usable medium can comprise a disk, a hard disk drive, or a server. In one embodiment, computer readable program code 501–505 can run on a computer that interfaces with the PLD and the external device for storing the check bits and the encrypted bitstream. In this computer-implemented embodiment, various computer platforms can be used. These platforms could include, for example, a PC using the Windows 95™ or NT™. 4.0 operating system with 128 MB of RAM and a 200 MHz Pentium Pro™ microprocessor, either stand alone or connected to a network, and a SUN™ workstation computer among others. The sets of logic can be implemented by, for example, the VirtexII™ programmable logic device sold by the assignee of the present invention.

As seen in the example above, the number of check bits can exceed the number of source bits (i.e. the identification code) by a substantial margin. Therefore, during the transmission of the check bits in step 201 (FIG. 2), some limited information regarding the construction of the key (i.e. source bits) is disclosed. In other words, an attacker would know by the transmitted check bits and by the algorithm used to compute them (assumed to be public knowledge) some information regarding the key.

Specifically, to crack the key, an attacker would need to guess only the number of source bits minus the number of errant bits that can be corrected. Thus, in the 56-bit key described above, guessing 56−8=48 bits would be relatively easy. Therefore, in accordance with one feature of the present invention, the number of bits in the key can be increased.

For example, in one embodiment, a 169-bit key can be used. For the same Hamming distance of 16, the 169 bits can be arranged in 13 rows of 13 bits. In this configuration, each row/column requires 6 additional check bits, for a total of 19×19=361 bits. Clearly, using a larger silicon ID and a corresponding larger number of check bits can result in a larger number of defective bits. Thus, additional check bits would be required to counter the increased number of defective bits. However, an attacker would still have to deduce 169−n corrected bits. Thus, assuming n=20, this would still leave 149 bits for the attacker to guess, which is a relatively difficult task.

Note that the check bits in accordance with the present invention can be added to the key bits directly (see FIG. 3) or the key can be generated using a hash function on the silicon ID. As a hash function, DES in CBC mode can be used as a message authentication code (MAC) using a built-in (i.e. mask-programmed) key.

The present invention has been described in reference to several embodiments. These embodiments are illustrative only and are not meant to be limiting. Those skilled in the art will recognize various modifications to those embodiments as well as other embodiments that fall within the scope of the present invention. For example, the Reed-Solomon code can also be used as an error-correcting code in accordance with the present invention.

Figure 6:
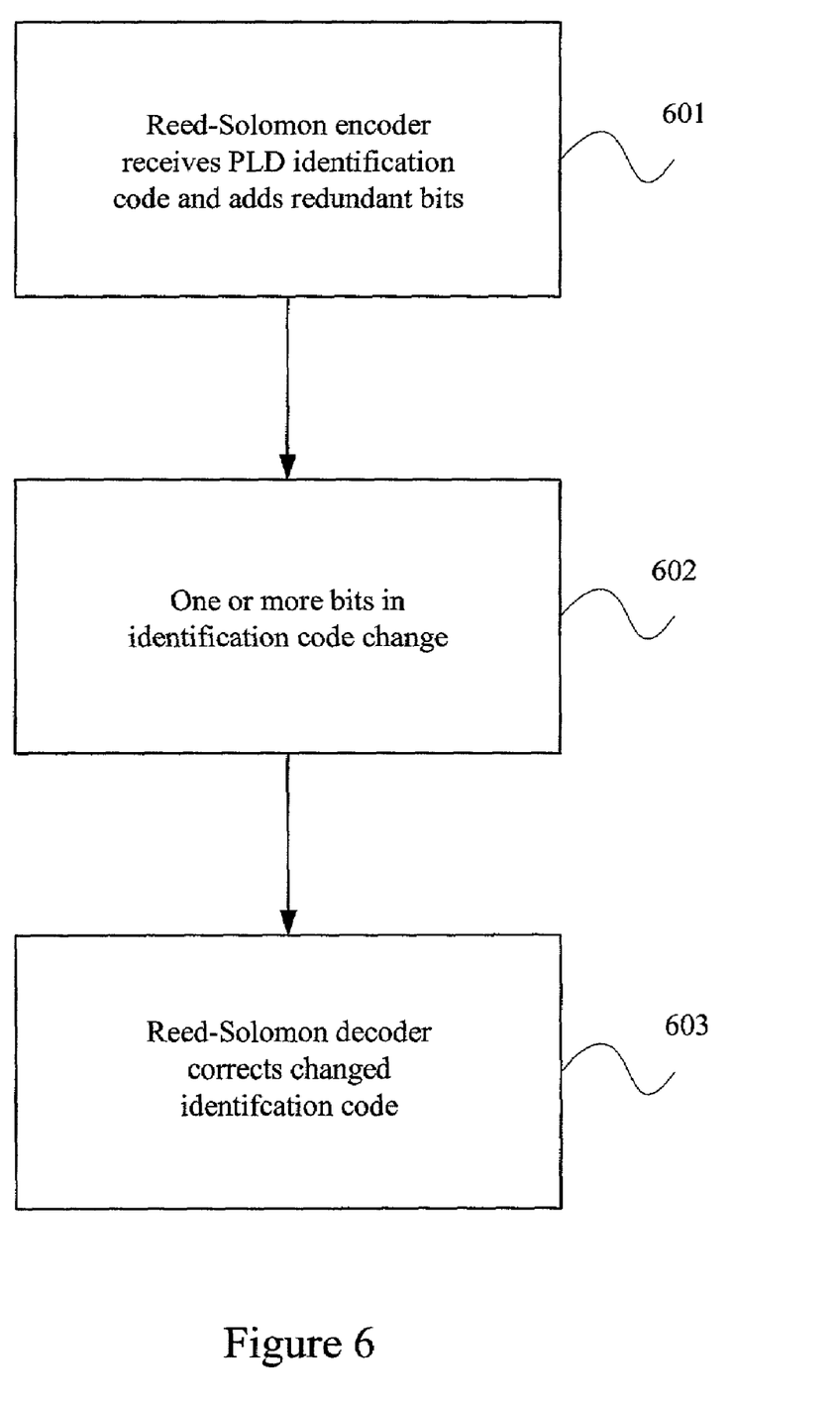
FIG. 6 illustrates a simplified flow chart indicating how the Reed-Solomon code can be used in the present invention.

The Reed-Solomon code is based on groups of bits, e.g. bytes, in contrast to individual 0s and 1s. In this manner, the Reed-Solomon code is particularly efficient in dealing with consecutive bit errors. FIG. 6 illustrates a simplified flow chart indicating how the Reed-Solomon code can be used in the present invention. Specifically, in step 601, a Reed-Solomon encoder can receive the source code, i.e. the identification code of the PLD, and add redundant bits. If bits in the identification code occur, as indicated in step 602, then a Reed-Solomon decoder can correct the errors as each group of bits is analyzed in step 603. Note that the number and type of errors that can be corrected depend on the implementation of the Reed-Solomon code. The Reed-Solomon code is explained in detail on a Web site having the URL: http://www.4i2i.com/reed_solomon_codes.htm, and is well known to those skilled in the art. Note that various commercial implementations exist including, for example, VHDL or Verilog designs (in logic/intellectual property (IP) cores) offered by 4i2i Communication Ltd., which can be implemented using PLDs (i.e. FPGAs) or application specific integrated circuits (ASICs).

Figure 7:
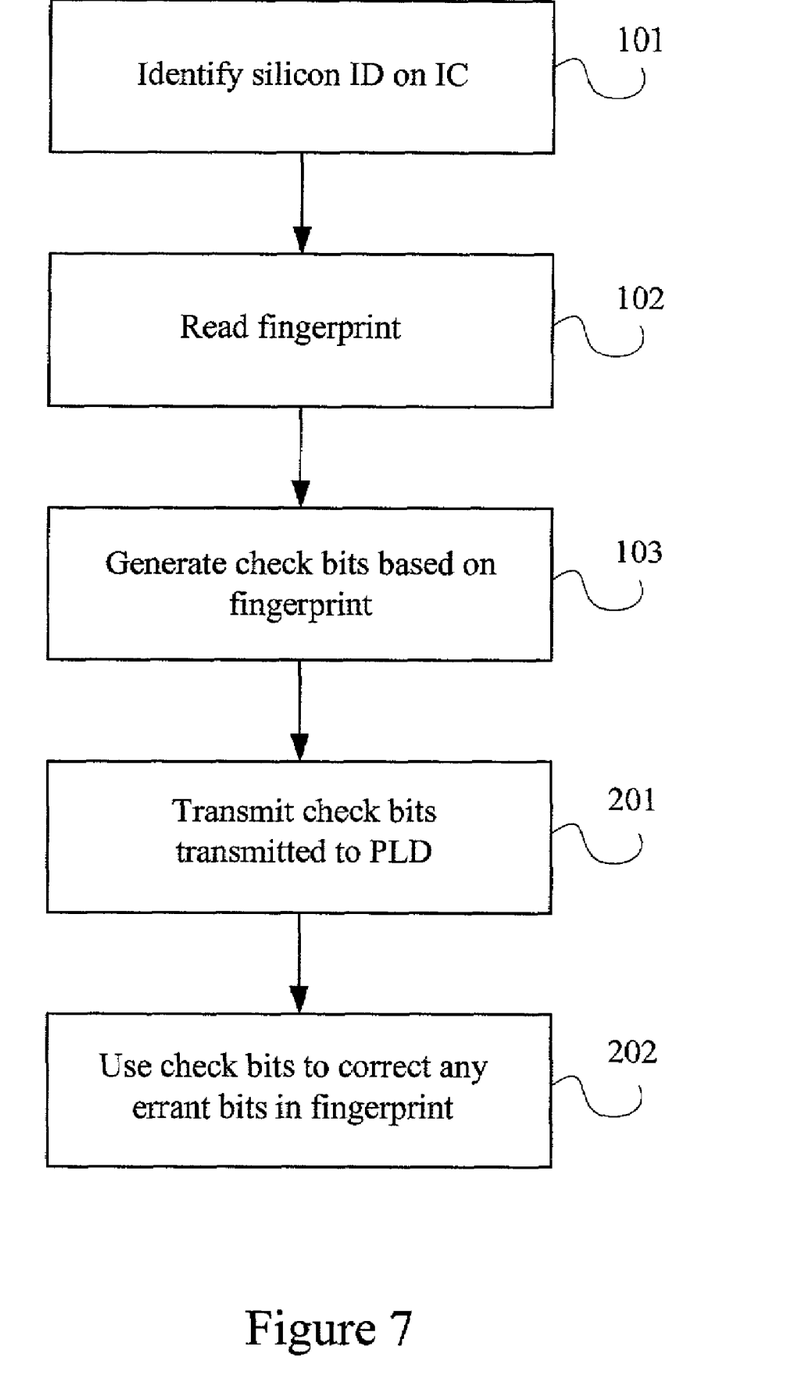
FIG. 7 illustrates a flow chart for identifying a PLD using a silicon code of the PLD and check bits in accordance with one embodiment of the present invention.

Note that the bit-correction process described above can be simplified to merely provide reliable chip identification. Specifically, referring to FIG. 7, steps 101–103 (FIG. 1) and steps 201–202 (FIG. 2) can be performed without the remainder of steps 104–106 and 203–205. In this manner, the present invention ensures that the silicon ID of the chip can be accurately corrected, if necessary. Therefore, the present invention is limited only by the appended claims.

The invention claimed is:

1. A method of programming a programmable logic device (PLD), the method comprising:
    identifying a first identification code on the PLD;
    reading the first identification code;
    generating a plurality of check bits based on the first identification code;
    creating a first key using the first identification code, wherein the first key is different from the first identification code;
    encrypting the configuration bitstream using the first key;
    storing the check bits and the encrypted bitstream without storing the first identification code and the first key;
    transmitting the check bits to the PLD;
    correcting any errant bits in the first identification code using the check bits, thereby generating a second identification code;
    creating a second key using the second identification code, wherein the second key is equal to the first key;
    transmitting the encrypted configuration bitstream; and
    decrypting the encrypted configuration bitstream using the second key.

2. The method of claim 1, wherein storing is performed in a non-volatile storage device.

3. The method of claim 2, wherein the non-volatile storage device includes a programmable read-only memory (PROM).

4. The method of claim 1, wherein at least one of identifying the first identification code on the PLD, reading the first identification code, and generating the plurality of check bits is performed by an external device.

5. The method of claim 4, wherein the external device includes a non-volatile memory device.

6. The method of claim 5, wherein the non-volatile storage device includes a programmable read-only memory.

7. The method of claim 6, wherein the external device includes software.

8. The method of claim 1, wherein generating the check bits includes using a product code.

9. The method of claim 1, wherein generating the check bits includes using a Reed-Solomon code.

10. The method of claim 1, wherein encrypting including using DES.

11. A computer program product including a computer usable medium, wherein the computer usable medium has a plurality of computer readable program codes embodied therein, the plurality of computer readable program codes comprising:
  a first computer readable program code that generates check bits based on ID bits for a PLD at a first point in time;
  a second computer readable program code that encrypts the bitstream using a first key based on the ID bits at the first point in time;
  a third computer readable program code that uses the check bits to correct any errant bits in the ID bits at a second point in time;
  a fourth computer readable program code that creates a second key based on the corrected ID bits after the second point in time, wherein the second key is equal to the first key; and
  a fifth computer readable program code for allowing the PLD to decrypt the encrypted bitstream using the second key;
  wherein the ID bits are different from the first key.

12. A system for programming a programmable logic device (PLD), the system comprising:
  a computer usable medium, wherein the computer usable medium has a plurality of computer readable program codes embodied therein, the plurality of computer readable program codes comprising:
    a first computer readable program code that generates check bits based on ID bits for a PLD at a first point in time; and
    a second computer readable program code that encrypts the bitstream using a first key based on the ID bits at the first point in time;
    a first set of logic on the PLD that uses the check bits to correct any errant bits in the ID bits at a second point in time;
    a second set of logic on the PLD that creates a second key based on the corrected ID bits after the second point in time, wherein the second key is equal to the first key; and
    a third set of logic on the PLD that allows the PLD to decrypt the encrypted bitstream using the second key;
  wherein the ID bits are different from the first key.

13. A method of programming a programmable logic device (PLD), comprising:
  generating a set of check bits from a first identification code;
  creating a first encryption key using the first identification code, wherein the first encryption key is different from the first identification code;
  encrypting configuration data into encrypted configuration data using first encryption key;
  storing the set of check bits and the encrypted configuration data without storing the first identification code and the first encryption key;
  obtaining a second identification code from the PLD;
  correcting each errant bit in the second identification code using the set of check bits;
  creating a second encryption key using the second identification code, wherein the second encryption key is different from the second identification code, and the second key is equal to the first key;
  decrypting the encrypted configuration data into decrypted configuration data using the second decryption key; and
  programming the PLD with the decrypted configuration data.

14. The method of claim 13, further comprising inputting to the PLD a configuration bitstream that includes the encrypted configuration data and the set of check bits.

15. The method of claim 13, wherein obtaining the second identification code includes generating the second identification code from a silicon fingerprint of the PLD.

16. The method of claim 13, further comprising bypassing the decrypting of the encrypted configuration data and outputting an error code in response to a number of errant bits being greater than a threshold number.

17. The method of claim 13, wherein generating the set of check bits and encrypting configuration data are performed by an external device coupled to the PLD.

18. The method of claim 17, wherein correcting each errant bit in the second identification code is performed on the PLD.

* * * * *